(12) United States Patent
Kim et al.

(10) Patent No.: US 11,011,054 B2
(45) Date of Patent: May 18, 2021

(54) IMAGE PROCESSING DEVICE AND DISPLAY DEVICE INCLUDING SAME, AND CONTROL METHOD THEREFOR

(71) Applicant: SAMSUNG ELECTRONICS CO., LTD., Suwon-si (KR)

(72) Inventors: Dong-wook Kim, Suwon-si (KR); Kwan-young Kim, Suwon-si (KR); Seung-il Yoon, Yongin-si (KR); Hyun-kyu Yun, Seoul (KR); Jae-myung Hur, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/650,531

(22) PCT Filed: May 16, 2018

(86) PCT No.: PCT/KR2018/005630
§ 371 (c)(1),
(2) Date: Mar. 25, 2020

(87) PCT Pub. No.: WO2019/074181
PCT Pub. Date: Apr. 18, 2019

(65) Prior Publication Data
US 2020/0273323 A1 Aug. 27, 2020

(30) Foreign Application Priority Data
Oct. 12, 2017 (KR) .......... 10-2017-0132051

(51) Int. Cl.
*G08C 23/04* (2006.01)
*H04N 21/422* (2011.01)

(52) U.S. Cl.
CPC ....... *G08C 23/04* (2013.01); *H04N 21/42225* (2013.01); *H04N 21/42226* (2013.01); *G08C 2201/20* (2013.01); *G08C 2201/92* (2013.01)

(58) Field of Classification Search
CPC ....... H04N 21/42225; H04N 21/42226; G08C 2201/20; G08C 2201/92
See application file for complete search history.

(56) References Cited

U.S. PATENT DOCUMENTS

| | | | |
|---|---|---|---|
| 7,924,167 B2 | 4/2011 | Hesdahl et al. | |
| 8,170,419 B2 | 5/2012 | Yong | |

(Continued)

FOREIGN PATENT DOCUMENTS

| | | |
|---|---|---|
| CN | 201029238 | 2/2008 |
| CN | 205029807 | 2/2016 |

(Continued)

OTHER PUBLICATIONS

International Search Report for PCT/KR2018/005630 dated Aug. 29, 2018, 5 pages with English Translation.

(Continued)

*Primary Examiner* — Brian P Yenke
(74) *Attorney, Agent, or Firm* — Nixon & Vanderhye, P.C.

(57) ABSTRACT

A display system is disclosed. The present system comprises a display device and an image processing device, wherein the display device transmits a control signal for controlling an external image source device to the image processing device in response to a signal received from a remote controller, and the image processing device processes an image received from an image source device, transmits the processed image to the display device, and transmits the control signal received from the display device to the image source device. The image processing device identifies a state (Continued)

change of the display device in response to control signal transmission, and transmits a signal for changing an operation mode of the remote controller to the display device if no change is identified, and when the signal for changing the operation mode of the remote controller is received, the display device transmits the received signal to the remote controller.

13 Claims, 11 Drawing Sheets

(56) References Cited

U.S. PATENT DOCUMENTS

| | | | |
|---|---|---|---|
| 8,848,106 B2* | 9/2014 | Ohmae | H04N 21/43615 |
| | | | 348/552 |
| 9,245,442 B2* | 1/2016 | Belz | G08C 23/04 |
| 9,661,255 B2* | 5/2017 | Keum | H04N 21/42204 |
| 9,984,563 B2 | 5/2018 | Ahn et al. | |
| 10,032,434 B2* | 7/2018 | Yoon | H04N 21/44227 |
| 10,198,337 B2 | 2/2019 | Lee | |
| 10,225,507 B2* | 3/2019 | Yoon | H04N 21/4345 |
| 10,326,960 B2* | 6/2019 | Hur | G08C 17/00 |
| 10,388,150 B2* | 8/2019 | Park | G08C 23/04 |
| 10,432,886 B2* | 10/2019 | Yoon | G08C 19/28 |
| 10,536,739 B2* | 1/2020 | Seo | H04N 21/43615 |
| 10,560,654 B2* | 2/2020 | Lee | H04N 5/33 |
| 10,721,433 B2* | 7/2020 | Lee | H04N 5/60 |
| 10,778,927 B2* | 9/2020 | Yoon | H04N 21/42204 |
| 10,796,564 B2* | 10/2020 | Kim | G06F 3/167 |
| 2005/0122438 A1 | 6/2005 | Sato | |
| 2008/0280586 A1* | 11/2008 | Den Ouden | G08C 17/02 |
| | | | 455/352 |
| 2009/0292992 A1* | 11/2009 | Cheng | H04N 5/775 |
| | | | 715/718 |
| 2010/0026512 A1* | 2/2010 | Wang | G08C 23/04 |
| | | | 340/12.22 |
| 2010/0156658 A1 | 6/2010 | Park et al. | |
| 2010/0185764 A1* | 7/2010 | Kondo | H04N 21/4341 |
| | | | 709/225 |
| 2011/0032425 A1* | 2/2011 | Kamohara | H04N 5/765 |
| | | | 348/553 |
| 2011/0037636 A1* | 2/2011 | Alexander | G08C 23/04 |
| | | | 341/176 |
| 2011/0157479 A1* | 6/2011 | Higuchi | H04N 21/43635 |
| | | | 348/734 |
| 2011/0164181 A1* | 7/2011 | Higuchi | H04N 21/43607 |
| | | | 348/552 |
| 2011/0167465 A1* | 7/2011 | Higuchi | H04N 21/42204 |
| | | | 725/117 |
| 2011/0244802 A1* | 10/2011 | Kozlowski | G08C 17/02 |
| | | | 455/66.1 |
| 2012/0023267 A1* | 1/2012 | Sasaki | H04N 21/43635 |
| | | | 710/14 |
| 2012/0319942 A1* | 12/2012 | Kim | H04N 21/436 |
| | | | 345/156 |
| 2013/0051584 A1* | 2/2013 | Higuchi | H04N 21/4122 |
| | | | 381/123 |
| 2013/0053992 A1* | 2/2013 | Higuchi | H04N 9/8211 |
| | | | 700/94 |
| 2013/0069769 A1* | 3/2013 | Pennington | H04N 21/4126 |
| | | | 340/12.28 |
| 2013/0113710 A1 | 5/2013 | Choi et al. | |
| 2013/0247117 A1* | 9/2013 | Yamada | H04B 5/0031 |
| | | | 725/93 |
| 2013/0330084 A1* | 12/2013 | Du | G08C 23/04 |
| | | | 398/106 |
| 2014/0022462 A1* | 1/2014 | Arling | G08C 23/04 |
| | | | 348/734 |
| 2014/0247396 A1* | 9/2014 | Ohmae | H04N 5/268 |
| | | | 348/705 |
| 2015/0103253 A1* | 4/2015 | Higuchi | H04N 21/8106 |
| | | | 348/705 |
| 2015/0179061 A1 | 6/2015 | Kim et al. | |
| 2016/0119741 A1* | 4/2016 | Huang | H04W 4/80 |
| | | | 455/41.3 |
| 2016/0173936 A1* | 6/2016 | Jung | H04N 21/42204 |
| | | | 725/27 |
| 2016/0205427 A1* | 7/2016 | Yoon | G06F 3/0482 |
| | | | 725/34 |
| 2018/0027204 A1* | 1/2018 | Kim | H04N 21/43637 |
| | | | 348/734 |
| 2018/0091851 A1* | 3/2018 | Bae | H04N 21/658 |
| 2018/0091898 A1* | 3/2018 | Yoon | H04R 5/02 |
| 2018/0189841 A1* | 7/2018 | Lee | G06Q 30/0255 |
| 2018/0197501 A1* | 7/2018 | Veeramani | H04N 21/4122 |
| 2019/0116334 A1* | 4/2019 | Lim | G08C 17/02 |
| 2020/0128289 A1* | 4/2020 | Machida | H04N 5/44 |

FOREIGN PATENT DOCUMENTS

| | | |
|---|---|---|
| JP | 2001-169368 | 6/2001 |
| KR | 10-2010-0012523 | 2/2010 |
| KR | 10-2010-0075257 | 7/2010 |
| KR | 10-2012-0017953 | 2/2012 |
| KR | 10-2013-0051153 | 5/2013 |
| KR | 10-1333429 | 11/2013 |
| KR | 10-1489810 | 2/2015 |
| KR | 10-2015-0071944 | 6/2015 |
| KR | 10-1739976 | 5/2017 |

OTHER PUBLICATIONS

Written Opinion of the ISA for PCT/KR2018/005630 dated Aug. 29, 2018, 11 pages with English Translation.

* cited by examiner

200

IMAGE PROCESSING DEVICE AND DISPLAY DEVICE INCLUDING SAME, AND CONTROL METHOD THEREFOR

This application is the U.S. national phase of International Application No. PCT/KR2018/005630 filed May 16, 2018 which designated the U.S. and claims priority to KR Patent Application No. 10-2017-0132051 filed Oct. 12, 2017, the entire contents of each of which are hereby incorporated by reference.

TECHNICAL FIELD

The disclosure relates to an image processing device that processes an image received from an image source and provides to a display device and a display device including the same and a control method therefor.

BACKGROUND ART

With the development of electronic technology, methods of using content providing external devices, such as a set-top box, a DVD, and an audio, that connect to a display device are being developed. In addition, with display devices becoming gradually thinner, main processors and key components are separated and provided as external devices. The various external devices connected to the display devices are disadvantageous for ruining the interiors of homes or businesses. Accordingly, users wanting a clean exterior have come to prefer hiding external devices such as a set-top box or an external image processing device of a display in furniture and to show only the display device externally.

Based on external devices such as the set-top box or the image processing device being placed in furniture, the infrared (IR) receiver may be covered leading to a situation where a user is unable to control the external device with a remote controller using IR. To solve this problem, the display device that is always externally exposed has come to receive a signal of the remote controller and transmit the signal to various external devices.

However, there is the disadvantage of a user experiencing discomfort based on a position of an external device being variously changed generating a situation of a display device not being able to normally transmit a signal of a remote controller to the external device and the remote controller not operating according to positional movement of the external device.

SUMMARY

The disclosure is based on the above-described necessity, and an object of the disclosure is in conveniently controlling a display device and external devices by a user despite various positional movements of the external devices by appropriately converting a mode of a remote controller.

According to an embodiment of the disclosure, the display system including a display device and an image processing device includes a display device configured to transmit a control signal for controlling an external image source device to the image processing device in response to a signal received from a remote controller and the image processing device configured to process an image received from the image source device and transmit the processed image to the display device, and transmit the control signal received from the display device to the image source device, and the image processing device is configured to identify a state change of the display device corresponding to the control signal transmission, and transmit a signal for changing an operation mode of the remote controller to the display device based on the state change not being identified and the display device is configured to, based on a signal for changing an operation mode of the remote controller being received, transmit the received signal to the remote controller.

An operation mode of the remote controller may include a first operation mode transmitting a BT signal and a second operation mode transmitting an IR signal, the control signal may be a control signal corresponding to the BT signal received by display device from the remote controller operating at a first operation mode, and the image processing device may, based on a state change of the display device corresponding to the control signal transmission not being identified, transmit a signal for changing the remote controller to the second operation mode to the display device.

The control signal transmitted from the image processing device to the image source device may include an IR signal.

According to another embodiment, the image processing device may, based on the remote controller operating at the second operation mode and a state change of the display device corresponding to the control signal transmission not being identified, provide a UI guiding to change a position of at least one of the image source device and the image processing device.

According to still another embodiment, the image processing device may store a control code set information of the image source device and transmit a control signal corresponding to the signal received from the remote controller to the image source device based on the stored information.

According to still another embodiment, the image processing device may identify a state change of the display device based on at least any one of a channel information region of an image output to the display device, a broadcast company logo region, a mute state generated based on changing a channel, and a volume control region.

According to an embodiment, an image received from an image source device and transmitting the processed image to a display device includes a communicator and a processor configured to receive a control signal for controlling the image source device from the display device, and controlling the communicator to transmit the received control signal to the image source device, and the processor is configured to identify a state change of the display device corresponding to the control signal transmission, and transmit a signal for changing an operation mode of a remote controller to the display device based on the state change not being identified.

The operation mode of the remote controller may include a first operation mode transmitting a BT signal and a second operation mode transmitting an IR signal, and the control signal may be a control signal corresponding to the BT signal received by the display device from the remote controller operating at a first operation mode, and the processor may, based on a state change of the display device transmission not being identified in response to the control signal, transmit a signal for changing the remote controller to the second operation mode to the display device.

The control signal being transmitted to the image source device through the communicator may include an IR signal According to another embodiment, the processor may, based on a state change of the display device not being identified, provide a UI guiding to change a position of at least one of the image source device and the image processing device.

According to still another embodiment, a storage for storing a control code set information of the image source device may be further included, and the processor may control the communicator to transmit a control signal corresponding to the signal received from the remote controller to the image source device based on the stored information.

According to still another embodiment, the processor may identify a state change of the display device based on at least any one of a channel information region of an image output to the display device, a broadcast company logo region, a mute state generated based on changing a channel, and a volume control region.

According to an embodiment, a control method of an image processing device processing an image received from an image source device and transmitting the processed image to a display device includes receiving a control signal for controlling the image source device from the display device, transmitting the received control signal to the image source device, and identifying a state change of the display device corresponding to the control signal transmission, and transmitting a signal for changing an operation mode of a remote controller to the display device.

According to the various embodiments of the disclosure as described above, a user may continuously control a display device and external devices without separate manipulation even if a position of an external device is changed, and thus user convenience may be improved.

DETAILED DESCRIPTION OF EXAMPLE EMBODIMENTS

Figure 1:
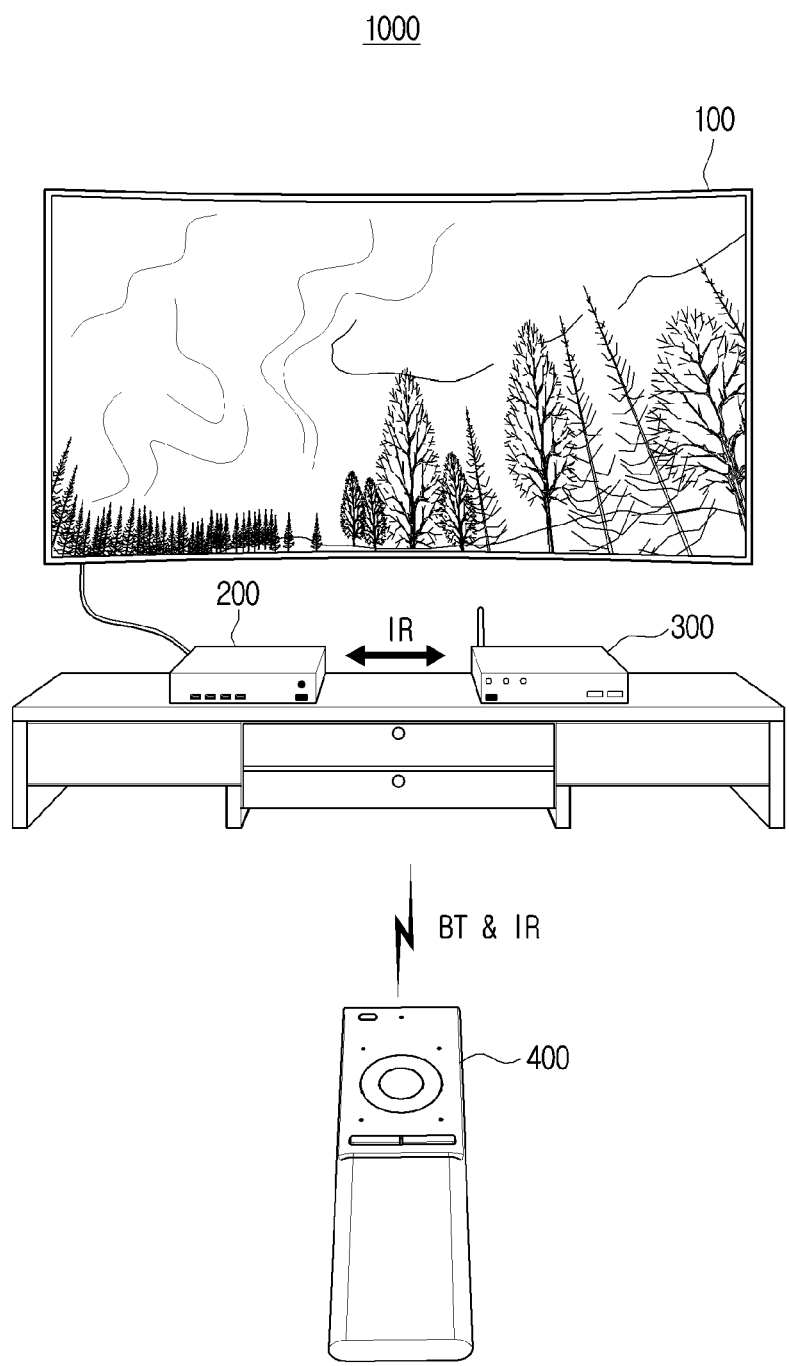
FIG. 1 is a diagram illustrating a display system according to an embodiment of the disclosure.

The disclosure will be described in greater detail below with reference to the accompanying drawings. In describing the disclosure, in case it is determined that the detailed description of related known function or configuration may unnecessarily confuse the gist of the disclosure, the detailed description thereof may be omitted. Further, the embodiments below may be modified to various different forms, and the scope of technical idea of the disclosure may not be understood as being limited to the embodiments below. Rather, the embodiments are provided to describe the disclosure more fully and completely, and to fully transfer the technical idea of the disclosure to one of ordinary skill in the art.

In addition, 'comprising' a certain element may be understood as further comprising another element rather than excluding another element unless otherwise specified. Further, it should be noted that various elements and regions in the drawings may be schematically drawn. Accordingly, the technical idea of the disclosure may not be limited by the relative size or distance illustrated in the accompanying drawings.

The disclosure will be described in greater detail below with reference to the accompanying drawings.

FIG. 1 is a schematic diagram illustrating a configuration of a display system according to an embodiment of the disclosure.

Referring to FIG. 1, the display system 1000 according to an embodiment may include a display device 100, an image processing device 200, an image source device 300, and a remote controller 400.

The display device 100 may be implemented to be controllable by the image processing device 200 using a remote control signal of the remote controller 400. For example, the display device 100 may be implemented as a TV. However, the display device 100 may include a display function such as a large format display (LFD), a digital signage, a digital information display (DID), a video wall, and a projector display, and may be implemented to an electronic device of various types controllable by an image processing device 200 using a remote controller 400.

The image processing device 200 may be implemented to process an image received from the image source device 300 and provide to the display device 100. The image processing device 200 may use a wired communication or a wireless communication to perform communication with the display device 100. For example, based on using a wired communication, communication may be performed by using a transparent optical cable for a clean exterior.

The image processing device 200 may use a wired communication and a wireless communication to perform communication with the image source device 300. For example, the image processing device 200 may perform communication using an infrared (IR) communication with the image source device 300.

The image processing device 200 may image process content of various types such as a variety of broadcast content of terrestrial, cable, satellite, and the like, web content, and VOD content provided from the image source device 330 and display on the display device 100.

The image source device 300 may provide an image to the image processing device 200. The image source device 300 may include various external devices capable of providing image data such as a set-top box, a set-top PC, a DVD player, a Blu-ray player, a USB, a solid state drive (SSD), and a hard disk drive (HDD). The image source device 300 may be implemented to a manipulatable form through various remote control devices such as a remote controller exclusive to the image source device and a universal remote controller.

According to an embodiment, the remote controller 400 may include control command codes for a plurality of devices subject to control by one remote controller and may control the subject devices separately or simultaneously. The remote controller 400 may control various devices through a wired communication method and a wireless communication method. Specifically, the wireless communication method may be implemented in various forms such as Bluetooth (BT), Infrared (IR), wireless fidelity (WI-FI), ZigBee, Beacon, and near field communication (NFC). In addition, the remote controller 400 may be implemented as a display device 100, an image processing device 200, and an image source device 300, and implemented to perform the various wired communication and wireless communication as described above.

According to an embodiment, the display device 100 may be exposed externally, and the image processing device 200 and the image source device 300 may be in a concealed state in furniture and the like.

The remote controller 400 may be operated at a mode (hereinafter, first operation mode) transmitting a remote controller signal through a Bluetooth (BT) signal. For example, the first operation mode may be a mode initially set by a manufacturer, but the operation mode may be changed according to user command or external command.

In the embodiment, based on a user manipulating the remote controller 400, the remote controller 400 may be implemented to transmit a corresponding remote controller BT signal to the display device 100, the display device 100 may transmit a control signal corresponding to the remote controller BT signal to the image processing device 200, and the image processing device 200 may transmit a control command corresponding to the control signal to the image source device 300 for a user to control the image source device 300.

According to another embodiment, the display device 100 and the image source device 300 may be exposed externally, and the image processing device 200 may be in a concealed state in furniture and the like.

The remote controller 400 may be operated at a mode (hereinafter, second operation mode) transmitting a remote controller signal including a control command corresponding to a control code set through an infrared (IR) signal. For example, according to an embodiment, the remote controller 400 may be converted to a second operation mode according to a predetermined event while operating in the first operation mode, which will be described in greater detail below.

In the corresponding embodiment, based on a user manipulating the remote controller 400, the remote controller 400 may directly transmit the control signal corresponding to the control code set stored in the image source device 300 to the image source device 300, and the user may directly control the image source device 300 according to the control command corresponding to the control signal.

Meanwhile, if the remote controller 400 transmits an IR signal as it operates in a second operation mode, the display 100 and the image processing device 200 may detect the signal sent by the remote controller 400 through a communicator (not shown). This is referred to as IR sniffing.

The communication method between the devices of the disclosure is not limited to a BT communication or an IR communication, and may include a wireless communication method communicating while connected with BT and a similar communication method of transmission quality reducing based on an obstacle being present in a signal transmission period similar with an IR communication.

Figure 2:
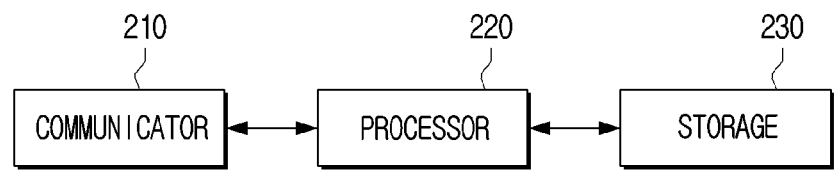
FIG. 2 is a block diagram illustrating a configuration of an image processing device according to an embodiment of the disclosure.

FIG. 2 is a block diagram illustrating a configuration of an image processing device according to an embodiment of the disclosure.

Referring to FIG. 2, the image processing device 200 may include a communicator 210, a processor 220, and a storage 230.

The communicator 210 may perform communication with a display device 100, an image source device 300, and a remote controller 400. The communicator 210 may perform communication through various communication methods such as Bluetooth (BT), Infrared (IR), Wireless fidelity (WI-FI), ZigBee, Beacon, near field communication (NFC), WAN, Ethernet, IEEE 1394, HDMI, USB, MHL, AES/EBU, Optical, or Coaxial.

The processor 220 may control an overall operation of the image processing device 200.

According to an embodiment, the processor 220 may be implemented as a digital signal processor (DSP), a microprocessor, and a time controller (TCON) processing a digital signal. However, the embodiment is not limited thereto, and may include one or more of a central processing unit (CPU), a micro controller unit (MCU), a micro processing unit (MPU), a controller, an application processor (AP), a communication processor (CP), or an ARM processor, or may be defined by the corresponding term. In addition, the processor 140 may be implemented as a system on chip (SoC) embedded with a processing algorithm, a large scale integration (LSI), or may be implemented in the form of a field programmable gate array (FPGA).

The processor 220 may use image data provided from the image source device 300 and control to display the image in the display device 100. The image data may be implemented as various types of image data such as a national broadcasting image of terrestrial, cable, satellite, and the like, web content image, and VOD content image.

The processor 220 may, based on the display device 100 receiving a remote controller signal to control the image source device 300 from the remote controller 400, receive a control signal corresponding to the remote controller signal to control the image source device from the display device 100, and transmit the received control signal to the image source device 300. The remote controller may operate at a first operation mode. The control signal may include at least one of a signal including a control code included in the received remote controller signal and identification information to identify a control code included in the remote controller signal.

For example, the processor 220 may, based on receiving a BT signal from the remote controller 400 operating at a first operation mode, transmit a control signal (e.g., IR signal) corresponding to the BT signal to the image source device 300. This is due to only the display device 100 being capable of receiving the BT signal, and the image source device 300 implemented as being incapable of receiving the BT signal.

However, according to another embodiment, based on receiving an IR signal from the remote controller 400 operating at a second operation mode, the processor 220 may not transmit the corresponding signal to the image source device 300. Based on the image source device 300 receiving the IR signal, the control operation may be performed multiple times for the same remote controller signal in the image source device 300.

Based on receiving a control signal from the display device 100, the processor 220 may identify a state change of the display device corresponding to the received control signal. Based on the state change of the display device 100 not being identified, the processor 220 may transmit a signal for changing an operation mode of the remote controller 400 that transmitted the remote controller signal to the display device 100. The display device 100 may then, based on receiving a signal for changing the operation mode of the remote controller 400, transmit the received signal to the remote controller 400.

The state change of the display device 100 may include at least one of an image output state change and a voice output state change.

According to an embodiment, the processor 220 may identify an image output state change or a voice output state change of a display device 100 based on at least any one of a channel information region of an image output to the display device 100, a mute state generated based on changing of broadcast company logo region and channel, and volume control region and size of a output voice.

Specifically, the display device 100 may receive a remote controller signal to change channel from the remote controller 400 and transmit to the processor 220. The processor 220 may transmit a control signal to change the channel to the image source device 300. The processor 220 may capture and obtain an image of the display device 100 to verify if the display device 100 is displaying the channel changed image from the image source device 300.

The processor 220 may receive a remote controller signal to change channel and may also capture and obtain an image displayed in the display device 100 prior to transmitting a control signal to the image display device. Accordingly, the display device 100 may verify whether the output image has been changed prior to and after receiving the remote controller signal.

According to an embodiment, the image output from the display device 100 may be captured in part or captured in full.

The processor 220 may then identify whether the image output by the display device 100 prior to and after receiving a remote controller signal is the same channel image based on an image processing operation.

For example, based on a user inputting a channel change command to the remote controller 400, if a series of control operation is normally performed, a region including channel information according to channel change may be included in the image output by the display device. The processor 220 may, at this time, verify whether the channel has been normally changed based on an image or text capable of identifying channel information such as a channel information region provided at one region of the obtained image and a broadcast company logo region. For example, the processor 220 may verify whether the logo displayed on one side of the screen has been changed from MBC to KBS, whether the channel number has been changed from channel 11 to channel 12, or whether the program title has been from "Infinite Challenge" to "2 Days & 1 Night". It is obvious that other various information in addition to broadcast company logos, channel numbers, and program titles, may be used to identify a corresponding channel.

Images and texts capable of identifying channel information such as a channel information region and a broadcast company logo region may recognize an outline of the corresponding region, recognize a color of the corresponding region, or may perform variously known image processing operation such as an optical character recognition (OCR).

According to another example, the processor 220 may identify whether the channel has been changed based on whether sound output from the display device 100 has a muting period. This is because, there is for example, a video mute period or a sound mute period according to frequency tuning time when changing the broadcast channel.

The processor 220 may at this time identify whether channel change has been normally performed by identifying if a video mute period has been generated by consecutively capturing an image prior to and after transmitting the remote control signal to the image processing device 300. In addition, the processor 220 may identify whether channel change has been normally performed after identifying an audio mute period appearing for a brief time by analyzing the audio signal transmitted to the display device 100.

In addition thereto, a microphone may be included in the remote controller 400, the remote controller 400 may record sound including a sound mute output from the display device 100 by time-tagging in real time to then transmit to the processor 220, and the processor 220 may identify whether sound mute occurred prior to and after a point in time of having received the remote controller signal.

The processor 220 may, based on an output volume of the display device 100 not being changed despite receiving a remote controller signal corresponding to a volume change command from the remote controller 400, identify the image source device 300 as being in a state incapable of receiving the control signal.

For example, the processor 220 may determine whether an output image obtained from the display device 100 includes a volume adjustment region using variously known image processing methods, and identify whether change of output volume was performed based therefrom.

In addition, the processor 220 may identify whether volume change occurred based on changes occurring to a volume adjustment bar, a number indicating volume size, or the like included in the volume adjustment region. In some cases, based on the image processing device 200 having a microphone, the processor 220 may identify whether volume change occurred based on the size of the received audio through the microphone.

The processor 220 may perform IR sniffing and not transmit a control command to the image source device 300. The specific operation based on the above may be described in FIG. 5 below.

Figure 3A:
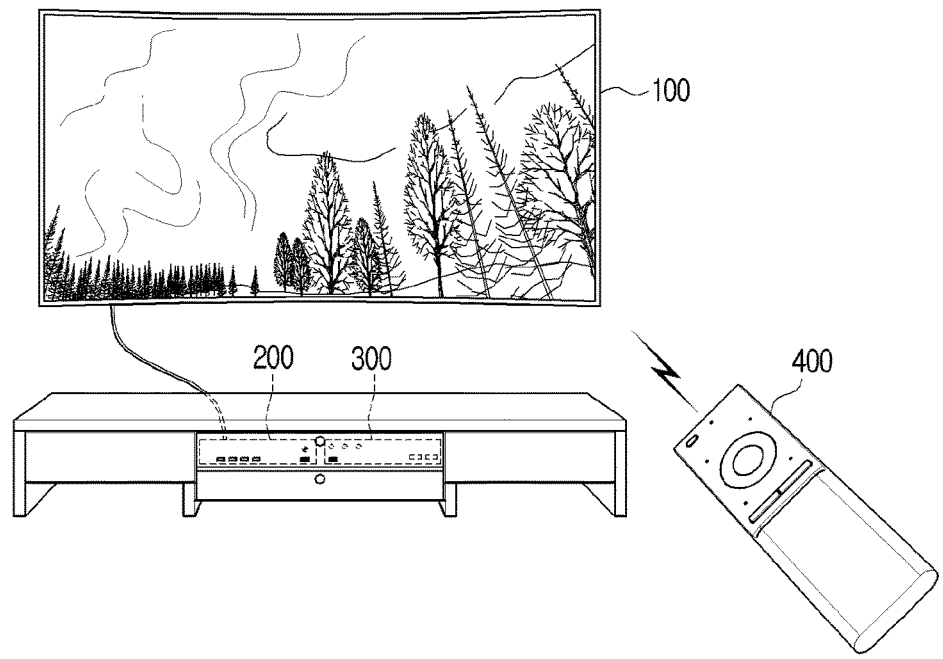
FIGS. 3A and 3B are diagrams for describing a system operation according to a positional change of external devices according to an embodiment of the disclosure.
Figure 3B:
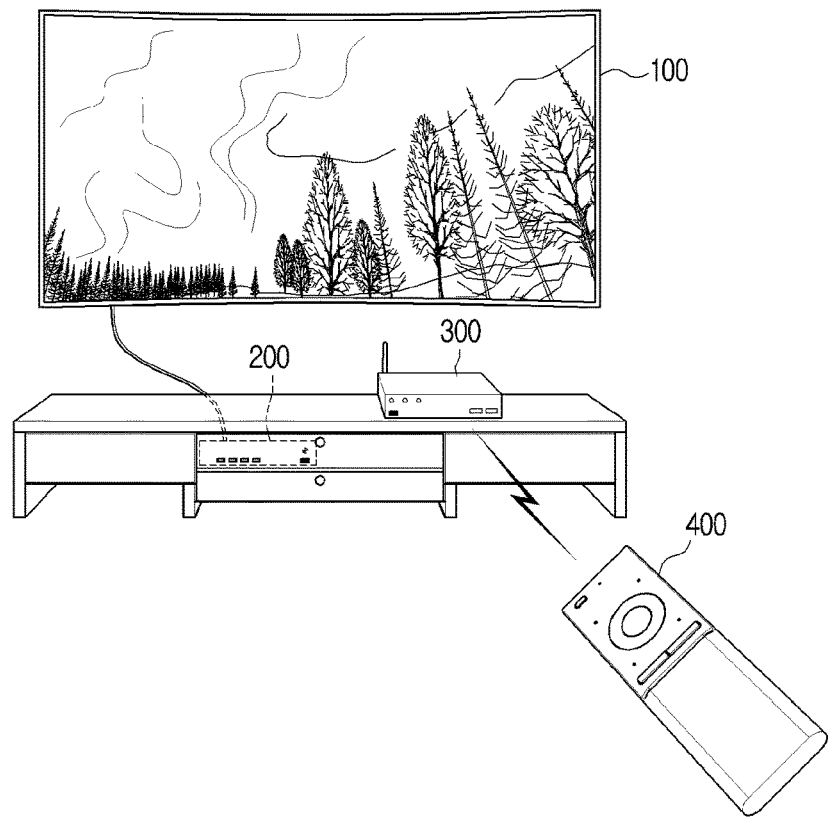

FIGS. 3A and 3B are diagrams for describing a system operation according to a positional change of external devices according to an embodiment of the disclosure.

FIG. 3A shows an image processing device 200 and an image source device 300 in a concealed state in a place not visible other than the display device 100 to not harm the surrounding exterior of the display device. In addition, the initial operation mode of the remote controller 400 indicates a state of first operation mode. The term concealed refers to a situation in which near field communication such as IR signal may be limited from one direction to a different direction due to physical obstacles and the like. The remote controller signal by the remote controller 400 operating at a first operation mode may be transmitted to the display device even if the external devices are concealed.

Referring to FIG. 3A, the display device 100 may transmit a control signal corresponding to the remote controller signal via wire, and the image processing device 200 may transmit a control command corresponding to the control signal to the image source device 300 using IR signal and the like. Based on the image processing device 200 and the image source device 300 being concealed in one space, communication may be possible by not only wired communication but also close proximity wireless communication such as IR and NFC.

The display device 100 may be connected with the image processing device 200 by a transparent optical cable for external wiring to appear uncomplicated.

According to an embodiment, as in FIG. 3A, a situation of a processor 220 not being able to control the image source device 300 may occur based on the image processing device 200 and the image source device 300 not being able to perform IR communication.

FIG. 3B shows the image source device 300 being placed in a space separated from the image processing device 200 based on a user cleaning a cabinet, or the like. That is, the image processing device 200 is placed inside the cabinet in a concealed state, and the image source device 300 is placed outside the cabinet in an unconcealed state.

In this example, a situation of not being able to perform control as in FIG. 3A may arise. That is, although the display device 100 may transmit a control signal corresponding to the remote controller signal to the image processing device 200 via wire, based on the image processing device 200 and the image source device 300 communicating by a close proximity communication method such as IR and NFC, the image processing device 200 may not transmit a control command corresponding to the control signal to the image source device 300 due to physical obstacles, and the like. Accordingly, a control operation similar to the previous operation may not be performed through the remote controller 400 based on the user placing the image source device 300 externally.

According to FIG. 3B, in order to solve the above-described problem, the image processing device 200 may control a control mode of the remote controller 400 to change to a second operation mode for the remote controller 400 to send a remote controller signal to the image source device 300 and not to send the remote controller signal to the display device 100, a detailed method of changing the control mode may be described in FIG. 10 below.

Accordingly, as indicated in FIGS. 3A and 3B, a user may be able to control the image source device 300 without changing a setting of the remote controller 400 separately even if the position of the image source device 300 is changed, thereby improving user convenience.

According to an embodiment, the remote controller may initially operate at one of a first operation mode and a second operation mode, the image processing device 200 may be in a concealed or unconcealed state, and the image source device 300 may also be in a concealed or unconcealed state. Thus, a total of eight number of cases may occur.

Accordingly, the above-described FIG. 3A represents one case in which the remote controller initially includes a first operation mode, and the image processing device 200 and the image source device 300 operates normally when they are concealed, and FIG. 3B represents one case in which the remote controller initially includes a first operation mode, and the operation mode of the remote controller 400 changes since no channel change has occurred when the image processing device 200 is concealed and the image source device 300 is not concealed.

According to another embodiment, the remote controller may be initially operated at a first operation mode, and the image processing device 200 and the image source device 300 may, for example, not be concealed.

In this example, the state change of the display device 100 according to user input may occur since the image processing device 200 and the image source device 300 may perform close proximity communication such as IR, and the image processing device 200 may not generate a signal for changing the operation mode of the remote controller 400, and the remote controller 400 may be maintained at a first operation mode.

According to still another embodiment, the remote controller may initially include a second operation mode, and the image processing device 200 and the image source device 300 may, for example, not be concealed.

Likewise, the state change of the display device 100 may occur since close proximity communication such as IR may be possible by the image processing device 200 and the image source device 300, and the image processing device 200 may not generate a signal for changing the operation mode of the remote controller 400 and the remote controller may be maintained at a second operation mode.

The display device 100 and the image processing device 200 may, at this time, perform sniffing of remote controller IR signal, but the image processing device 200 may not provide a control command corresponding to the remote controller IR signal to the image source device 300.

According to still another embodiment, the remote controller may initially include a second operation mode, and the image processing device 200 may be concealed and the image source device 300 may, for example, not be concealed.

In this example, like in the above-described FIG. 3(B), based on the remote controller 400 providing the remote controller IR signal to the image source device 300, the state change of the display device 100 may occur as the image source device 300 provides the changed image data to the image processing device 200. The image processing device 200 may identify the state change of the display device having occurred as the remote controller IR signal is transmitted based on IR sniffing performed by the display device 100. That is, the state of the display device having changed may be identified according to user command input to the remote controller 400 operating at a second operation mode. Accordingly, the image processing device 200 may not generate a signal for changing the operation mode of the remote controller 400, and the remote controller 400 may be maintained at a second operation mode.

According to still another embodiment, the remote controller may initially include a first operation mode, and the image processing device 200 may not be concealed and the image source device 300 may, for example, be concealed.

In this example, consequently, the remote controller 400 may not be able control the image source device 300 in whichever operation mode.

Specifically, based on the remote controller 400 operating at a first operation mode, the remote controller BT signal may be transmitted to the image processing device 200 through the display device 100. However, based on the image processing device 200 and the image source device 300 being able to communicate by a close proximity communication method such as IR and NFC, the image processing device 200 may not transmit a control command corresponding to the control signal to the image source device 300. Accordingly, the image source device 300 may not provide the changed image data corresponding to the remote controller BT signal. The image processing device 200 may then identify that a state change of the display device 100 has not occurred despite the remote controller BT signal having been input.

The image processing device 200 may receive a control signal corresponding to the remote controller BT signal from the display device 100, and based on the state change of the display device 100 not occurring, determined on its own as to whether the image processing device 200 is concealed.

That is, the image processing device 200 may transmit a predetermined probe request to the remote controller 400, and based on the remote controller 400 transmitting a probe response corresponding to a probe request to the image processing device 200, the image processing device 200 may be determined as not concealed. Likewise, in the corresponding embodiment, the image processing device 200 may be determined as not concealed.

Accordingly, based on the remote controller 400 operating at a first operation mode, the image processing device 200 not being concealed, and the state change of the display device 100 not occurring, as no state change of the display device occurs despite the remote controller 440 operating at a second operation mode, there may no longer be a method for controlling the image source device 300 according to user input. Even if the remote controller 400 operates at a second operation mode, the reason why state change of the display device 100 did not occur is due to the image processing device 200 and the image source device 300 being placed at positions at which close proximity communication such as IR and NFC is not possible.

Accordingly, based on the image processing device 200 receiving a control signal corresponding to the remote controller BT signal from the remote controller 400, the image processing device 200 not being concealed, and the image processing device 200 identifying that state change of the display device 100 has not occurred, a UI guiding a user to change at least one position of the image processing device 200 and the image source device 300 may be provided to the display device 100.

Figure 8:
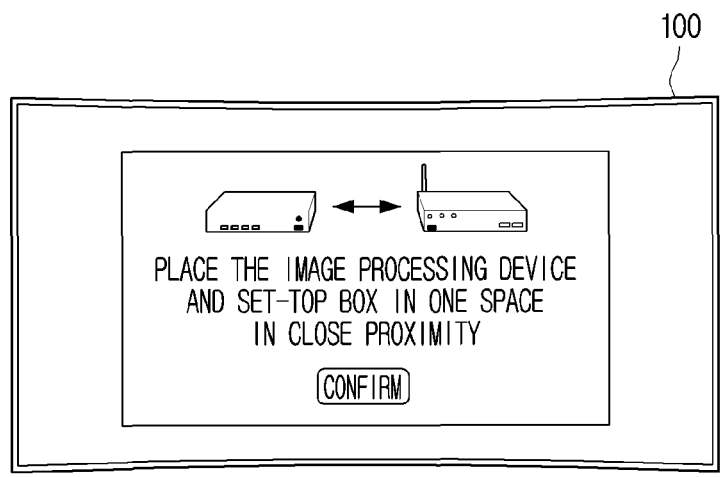
FIG. 8 is a diagram for describing a UI guiding to change at least one position of an image processing device and an image source device according to an embodiment of the disclosure.

The guide UI may be displayed in the display device 100 as in FIG. 8.

According to still another embodiment, the remote controller may initially include a second operation mode, and the image processing device 200 may not be concealed and the image source device 300 may, for example, be concealed.

Likewise, remote controller 400 may not be able control the image source device 300 in whichever operation mode.

In this example, as described above, since the state change of the display device 100 may not occur despite the remote controller 400 being changed to a first operation mode, there may no longer be a method for controlling the image source device 300 according to user input.

Accordingly, based on the image processing device 200 receiving a control signal corresponding to the remote controller IR signal from the remote controller 400, the image processing device not being concealed, and the image processing device 200 identifying that state change of the display device 100 has not occurred, a UI guiding a user to change at least one position of the image processing device 200 and the image source device 300 may be provided to the display device 100. The guide UI may be displayed in the display device 100 as in FIG. 8.

According to still another embodiment, the remote controller may initially include a second operation mode, and the image processing device 200 and the image source device 300 may, for example, be concealed.

In this example, the display device 100 may provide a control command to the image processing device 200 based on the sniffed IR signal (IR sniffing). The control command may include information on the remote controller 400 operating at a second operation mode having transmitted the remote controller IR signal together with a command of not providing the control operation input by the user to the image source device 300.

Accordingly, the image processing device 200 may identify that the remote controller 400 operating at a second operation mode has transmitted the remote controller IR signal, and then detect that no state change which is displayed in the display device 100 has occurred. Accordingly, the image processing device 200 may generate a signal for changing the operation mode of the remote controller 400 and transmit to the remote controller 400 through the display device 100. Based on a signal for changing the received operation mode, the remote controller 400 may change the operation mode to a first control mode.

As described above, the image processing device 200 may change the operation mode of the remote controller 400 to reduce discomfort experienced by a user as the position of the image processing device 200 and the image source device 300 is changed, or may provide a UI.

Figure 4:
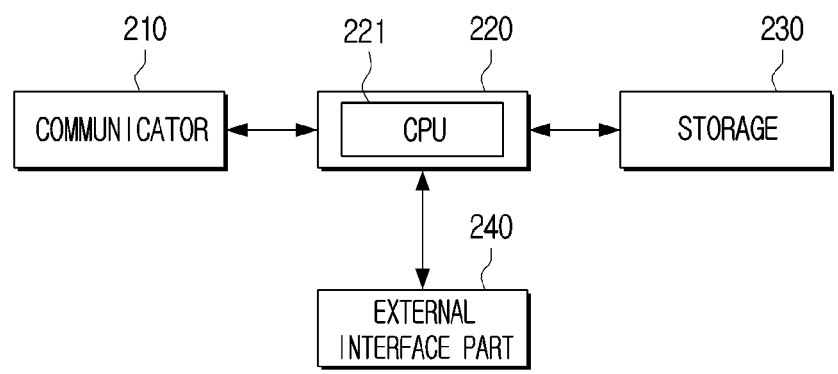
FIG. 4 is a block diagram illustrating an example of a detailed configuration of an image processing device according to an embodiment of the disclosure.

FIG. 4 is a block diagram illustrating an example of a detailed configuration of an image processing device according to an embodiment of the disclosure.

Referring to FIG. 4, the image processing device 200 may include a communicator 210, a processor 220, a storage 230, and an external interface 240. From the configurations illustrated in FIG. 4, detailed description of configurations overlapping with those disclosed in FIG. 2 may be omitted.

The processor 220 may include a read-only memory (ROM, or non-volatile memory) stored with a control program for controlling a display system 100 and a random access memory (RAM, or volatile memory) for storing data of the display system 100 input externally or used as storage region corresponding to various operations performed in the display system 1000.

The processor 220 may execute an operating system (O/S), programs, and various applications stored in the storage 230 based on a predetermined event being generated. The processor 220 may include a single core, a dual core, a triple core, a quad core, and multiple cores thereof.

A CPU 221 may access the storage 230 and perform booting using the O/S stored in the storage 230. The CPU 221 may then use the various programs, content, data and the like stored in the storage 230 and the external interface 240 to perform various operations.

The storage 230 may store various data, programs or applications for driving and controlling the display system 1000. The storage may store control programs for controlling the display system 1000 and the processor 220, applications initially provided by the manufacturer or externally downloaded, databases or related data. For example, the storage 230 may provide a UI according to the various embodiments provided herein, and store programs for performing an operation related to the UI.

The storage 230 may be implemented as an internal memory such as a ROM or RAM, or implemented as a memory separate from the processor 220. In this example, the storage 230 may be implemented in memory form embedded to the display device 100 or implemented in memory form detachable from the display device 100 according to data storage use. For example, in the example of data for driving of the display device 100, the data may be stored in the embedded memory in the display device 100, and in the case of data for extension function of the display device 100, the embedded in the display device 100 may be implemented to forms such as a non-volatile memory, a volatile memory, a hard disk drive (HDD), or a solid state drive (SSD).

According to an embodiment, the storage 230 may pre-store information on a control code set for the remote controller 400 to control the image source device 300 and a control command corresponding to each control code included in the control code set. Accordingly, the control signal corresponding to the signal received from the remote controller 400 based on the stored control code set information may be transmitted to the image source device 300.

The processor 220 may perform communication with the external interface 240. The external interface 240 may be a wired interface or a wireless interface. For example, the external interface 240 may be a wired interface such as a universal serial bus (USB) or a wireless interface such as a Bluetooth.

Figure 5:
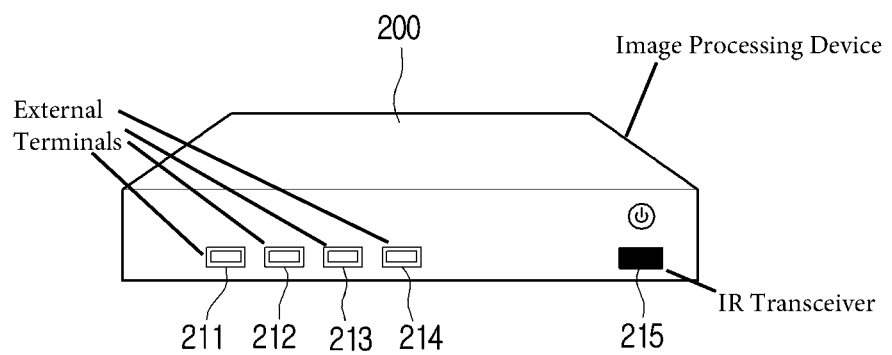
FIG. 5 is a diagram for describing an image processing device according to an embodiment of the disclosure.

FIG. 5 is a diagram for describing an image processing device according to an embodiment of the disclosure.

Referring to FIG. 5, the image processing device 200 may include various external terminals 211 to 214 and an IR transceiver 215. Information of various forms such as outer interface, image data, voice data, and text data may be received through the various external terminals 211 to 214. For example, an external terminal 211 may be connected with the display device 100 through a transparent optical cable, and an external terminal 212 may connect a HDMI cable to receive image data input, an external terminal 213 may connect a USB memory included with an external interface from the image source device 300, and an external terminal 214 may connect a SSD to obtain image data pre-stored in the SSD.

Referring to FIG. 5, the IR transceiver 215 may perform IR communication with various external devices.

For example, IR communication may be performed with the IR transceiver of the image source device 300. The image processing device 200 may generate a control command in the processor 220 and transmit a control signal corresponding to the control command using IR communication to the image source device 300 through the IR transceiver 215.

According to another example, the IR transceiver 215 may perform IR sniffing on the remote controller IR signal of the remote controller 400 operating at a second operation mode. The control command corresponding to the IR sniffed signal may not be provided to the image source device 300. This is because, if the image processing device 200 provides the control command corresponding to the remote controller IR signal to the image source device 300, the image source device 300 may perform the same control command as the remote controller IR signal, which the image source device 300 itself has received, twice, causing inconvenience to the user. Through IR sniffing, the remote controller 400 may identify that a remote controller IR signal corresponding to user input has been transmitted. Based on the state change of the display device not being identified despite the remote controller IR signal having been transmitted, the processor 220 may generate a command to change the operation mode of the remote controller 400.

Figure 6:
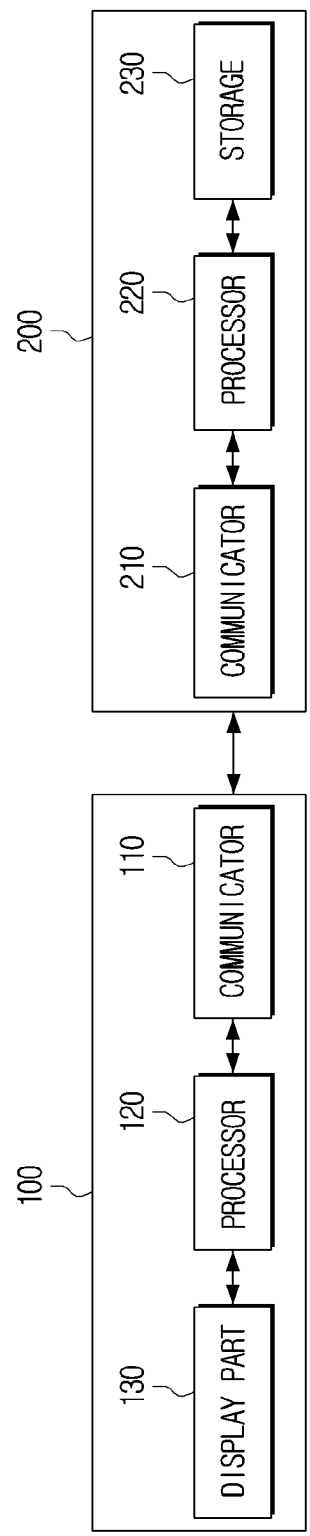
FIG. 6 is a block diagram illustrating a configuration of a display device and an image processing device according to an embodiment of the disclosure.

FIG. 6 is a block diagram illustrating a configuration of a display device and an image processing device according to an embodiment of the disclosure.

Referring to FIG. 6, the display device 100 may include a communicator 110, a processor 120, a display part 130, and a storage (not shown).

The communicator 110 is a configuration for performing wired communication or wireless communication with various external devices. Specifically, the communicator 110 may include an input and output port for wired connection with external devices such as the image processing device 200, and various wireless communication chips such as a WI-FI chip, a Bluetooth chip, a NFC chip, and a wireless communication chip for performing wireless communication.

The communicator 110 may communicate with the image processing device 200, and receive image data from the image communication device. In addition, the communicator 110 may receive a remote controller signal of the remote controller 400 and transmit a control signal corresponding to the remote controller signal to the image processing device 200 to control the image source device 300. According to still another embodiment, if the image source device 300 is concealed so as to not receive an IR signal of the remote controller 400, a communicator 100 including the IR transceiver may perform IR sniffing of the remote controller IR signal to be directly transmitted to the image source device 300 by the remote controller 400 so that the image processing device 200 may identify whether the image source device 300 performs an operation corresponding to the remote controller IR signal.

The processor 120 is a configuration for controlling the overall operation of the display device.

For example, the processor 120 may include a CPU, a RAM, a ROM, and a system bus. The ROM may be a configuration in which a command set is stored for system booting, and the CPU may copy the O/S stored in the storage of the display device 100 to the RAM according to the commands stored in the ROM, and execute the O/S to boot the system. Based on the booting being completed, the CPU may copy various applications stored in the storage to the RAM, and execute the applications to perform various operations. In the above, the processor 120 may be described as including only one CPU, but may be implemented with a plurality of CPUs (or DSP, SoC, etc) in the implementation.

According to an embodiment, the processor 120 may be in a connected state as the remote controller 400 operating at a first operation mode with the display device 100 perform communication according to a pre-defined communication method based on a predetermined event being generated. The connecting may refer to all states in which communication is possible between the display device 100 and the remote controller 400 such as an operation initializing communication, an operation forming a network, an operation performing device pairing between the display device 100 and the remote controller 400. For example, based on a predetermined event occurring in the display device 100 or the remote controller 400, periphery devices may be detected through digital living network alliance (DLNA) technology and pairing with the detected device may be performed to be in a connected state.

The processor 120 may generate a control command according to different control modes from one another of the remote controller 400.

For example, based on receiving a remote controller BT signal from the remote controller 400 operating at a first operation mode, the processor 120 may generate a control signal including a control command to control the image source device 300 in the image processing device 200 based on the remote controller BT signal.

According to another example, based on IR sniffing the remote controller IR signal from the remote controller 400 operating at a second operation mode, the processor 120 may generate a control command to not control the image source device 300 in the image processing device 200 based on the remote controller IR signal.

This is because, if the image processing device 200 transmits the control command corresponding to the stored remote controller IR signal to the image source device 300, the image source device 300 may perform the same control command as the remote controller IR signal, which the image source device 300 itself has received, twice, causing inconvenience to the user.

However, in this example, the display device 100 may transmit information that the remote controller IR signal to control the image source device 300 has been received to the image processing device 200, and after the image processing device 200 identifies whether image change of the display device 100 occurs, the image processing device 200 may identify that the image source device 300 is concealed based on there being no change in output state.

The display device 100 may store a control code set corresponding to the image source device 300 in the storage (not shown), and store control information on control command corresponding to the control code set in the storage (not shown). Accordingly, a control command corresponding to the remote controller IR signal may be identified based on the stored control information, and the received remote controller signal may be identified as a remote controller IR signal for the image source device 300 rather than a signal for the display device 100.

The display part 130 may display various screens according to a the control of the processor 120.

The display part 130 may be implemented in various forms such as, for example, liquid crystal display (LCD), organic light-emitting diode (OLED), liquid crystal on silicon (LCoS), digital light processing (DLP), quantum dot (QD) display panel, and display projector. In addition, the display part 130 may be implemented in touchscreen form capable of detecting user touch manipulation.

The display part 130 may display an image received from the image processing device 200. In addition, the display part 130 may display various pre-stored UI screens.

Referring to FIG. 6, the display device 100 may perform communication with the communicator 210 of the image processing device 200 through the communicator 110. For example, the communicator 210 may transmit image data obtained by the image processing device 200 from the image source device 300 to the communicator 100 through wired communication, and the communicator 100 may perform wired communication or wireless communication for transmitting and remote controller receiving control command with the communicator 210 of the image processing device 200. The wired communication and wireless communication may be implemented to various forms as described above.

Figure 7:
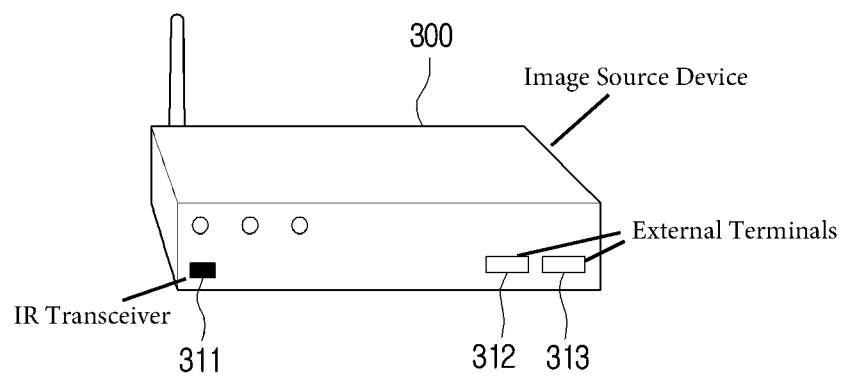
FIG. 7 is a diagram for describing an image source device 300 according to an embodiment of the disclosure.

FIG. 7 is a diagram for describing an image source device 300 according to an embodiment of the disclosure.

From the configuration illustrated in FIG. 7, a detailed description of the configurations and operations described in FIGS. 1 and 5 may be omitted.

According to an embodiment, the image source device 300 may include an IR transceiver 311. The IR transceiver 311 may transmit and receive various control commands by performing IR communication with the IR transceiver 215 of the image processing device 200. In addition, the IR transceiver 311 may receive a remote controller signal of dedicated remote controller which is dedicated an image source device 300 (not shown) or a remote controller signal of the remote controller 400 and perform a control operation corresponding to the remote controller signal.

According to an embodiment, the image source device 300 may include various external terminals 312 and 313. The image source device 300 may transmit image data to the image processing device 200 by connecting an HDMI cable to an external terminal 312, and may be provided with an image from an on-line image provider by connecting a LAN cable to an external terminal 313. However, the embodiment may not be limited to the embodiments, and may include various implementable forms capable of receiving an image and providing the image to the display device 100 or the image processing device 200.

FIG. 8 is a diagram for describing a UI guiding to change at least one position of an image processing device and an image source device according to an embodiment of the disclosure.

According to an embodiment, a situation in which the image source device 300 not being controllable through the first operation mode and the second operation mode of the remote controller 400 may arise. For example, based on only one of the image processing device 200 and the image source device 300 being concealed and positioned, the image source device 300 may not be controlled by the remote controller 400.

In this example, since this is a problem generated by the image processing device 200 and the image source device 300 being physically separated, a UI guiding a user to place the image processing device 200 and the image source device 300 within at least an IR communicable range may be popped-up on the display device 100. Accordingly, the image processing device 200 may, based on the state change of the display device 100 not being identified despite receiving a remote controller signal through the display device 100 from the remote controller 400 operating at a first operation mode and a second operation mode via the display device 100, control the display device 100 to display a guide UI.

The embodiment is not limited to the image and description as illustrated in FIG. 8, and may include UIs of all forms guiding the image processing device 200 and the image source device 300 to be placed within transmitting and receiving range of the communication method used in IR communication and inter-communication.

Figure 9:
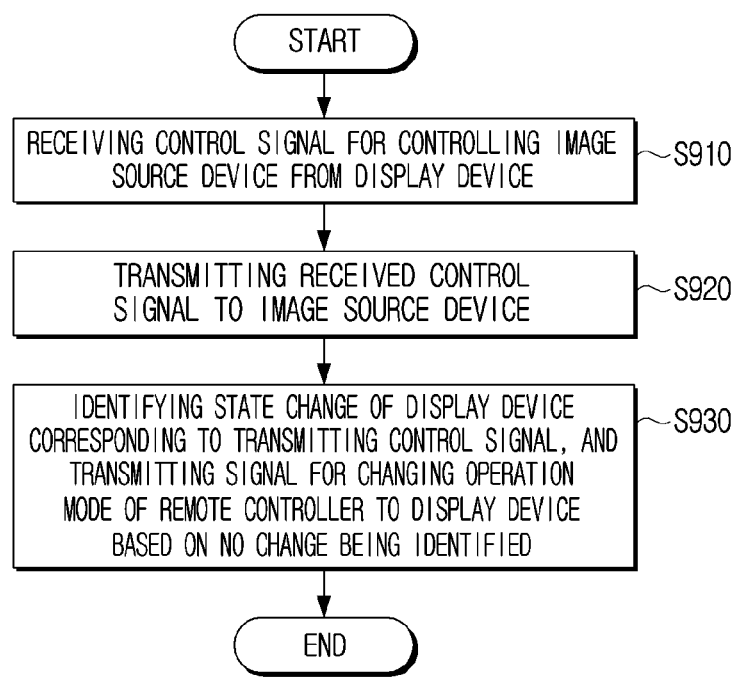
FIG. 9 is a flow chart for describing a method of controlling an image processing device according to an embodiment of the disclosure.

FIG. 9 is a flow chart for describing a method of controlling an image processing device according to an embodiment of the disclosure.

Referring to FIG. 9, the image processing device 200 may receive a control signal to control the image source device 300 from the display device 100 (S910). The remote controller 400 may operate at a first operation mode or a second operation mode, and transmit a remote controller signal including a control signal. The image processing device 200 may then transmit the received control signal to the image source device 300 (S920). After identifying a state change of the display device corresponding to the control signal transmission, a signal for changing the operation mode of the remote controller 400 may be transmitted to the display device 100 based on a change not being identified (S930). Accordingly, the operation mode of the remote controller 400 may be changed by the display device 100 transmitting the signal for changing the operation mode to the remote controller 400.

Figure 10:
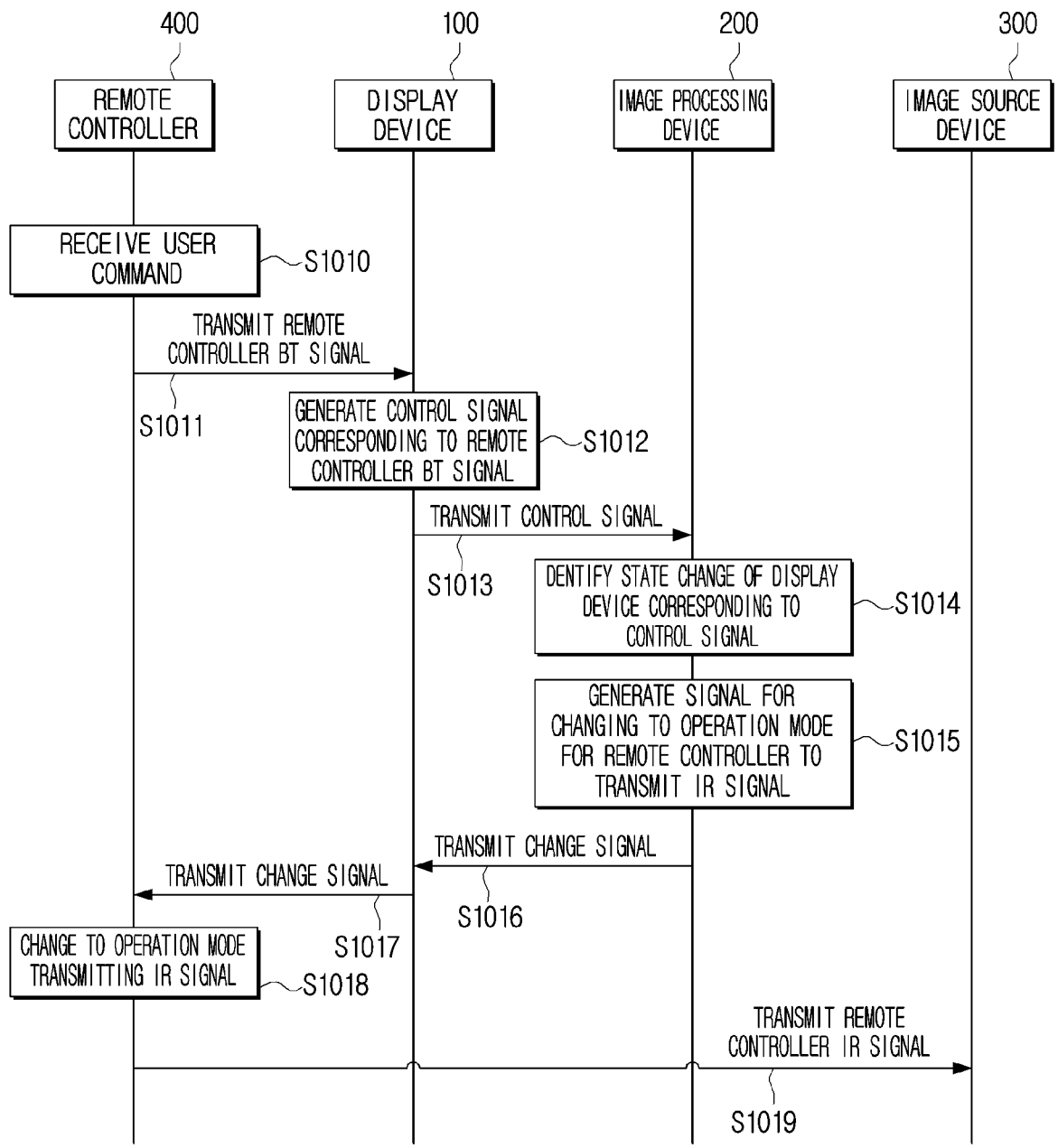
FIG. 10 is a diagram for describing an operation of a display system based on a remote controller initially operating at a first operation mode according to an embodiment of the disclosure.

FIG. 10 is a diagram for describing an operation of a display system based on a remote controller initially operating at a first operation mode according to an embodiment of the disclosure.

FIG. 10 illustrates the process of changing the operation mode of the remote controller 400 in a state where the image processing device 200 is concealed, and the image source device 300 is not concealed as in the state illustrated in FIG. 3(B).

Referring to FIG. 10, the remote controller 400 may receive user command (S1010). For example, the command may be, for example, channel up, volume down, and the like. The remote controller 400 may, at this time, operate at a first operation mode. The remote controller 400 may transmit a remote controller BT signal to the display device 100 according to the input user command (S1011).

The display device 100 may then generate a control signal including a control command corresponding to the remote controller BT signal (S1012). The control command may correspond with user command, and may be a command such as, for example, channel up and volume down for transmitting to the image source device 300.

The display device 100 may transmit the generated control signal to the image processing device 200 (S1013). The image processing device may attempt to transmit a control command including the received control signal to the image source device 300. Based on identifying a state change of the display device 100 corresponding to the control signal (S1014), the image processing device 200 may identify whether the image source device received a control command corresponding to the control signal. Based on the image processing device being concealed and the image source device 300 not being concealed, there may be no state change of the display device. Since the image processing device 200 and the image source device 300 may perform close proximity communication such as IR, transmission quality may reduce due to obstacles in the communication section.

Accordingly, based on identifying that there is no state change of the display device 100, a signal to change to a second operation mode transmitting the IR signal by the remote controller 400 is generated (S1015). The image processing device 200 may transmit a change signal to the display device 100 (S1016), and the display device 100 may transmit the change signal to the remote controller 400 (S1017). Accordingly, the operation mode of the remote controller may be changed to a second operation mode transmitting an IR signal based on a control command included in the received change signal (S1018).

Based on the remote controller transmitting the IR signal to the image source device 300 (S1019), the image source device may transmit a channel up image signal or a volume down image signal to an external control device through a HDMI cable, and display an image corresponding to user command on the display device 100.

Figure 11:
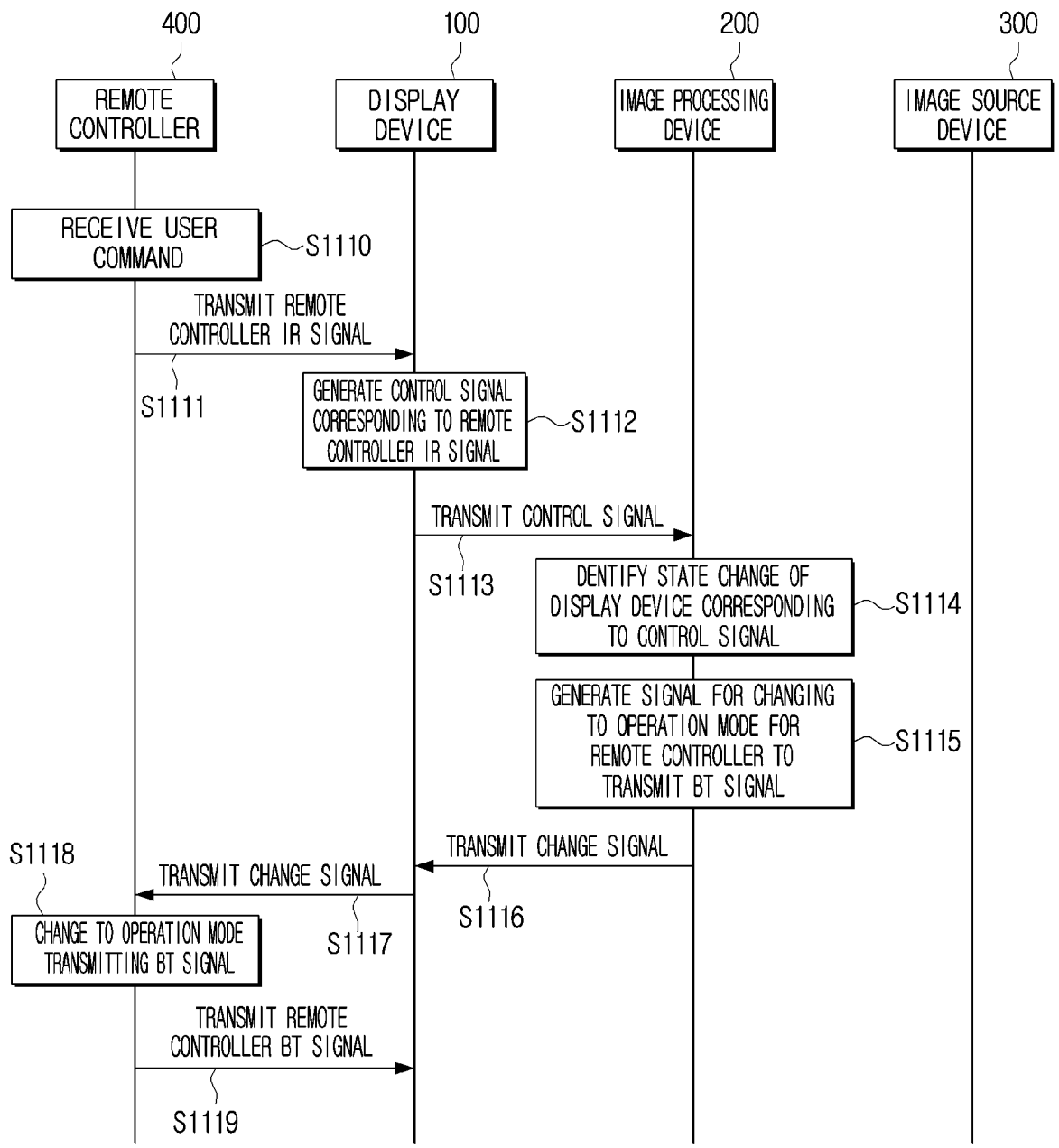
FIG. 11 is a diagram for describing an operation of a display system based on a remote controller initially operating at a second operation mode according to an embodiment of the disclosure.

FIG. 11 is a diagram for describing an operation of a display system based on a remote controller initially operating at a second operation mode according to an embodiment of the disclosure.

FIG. 11 describes the processing of changing an operation mode of the remote controller 400 based on the image processing device 200 and the image source device 300 being in a concealed state.

Referring to FIG. 11, the remote controller 400 may receive user command (S1110). For example the command may be commands such as, for example, channel up and volume down. The remote controller 400 may operate at a second operation mode. The remote controller 400 may transmit the remote controller IR signal to the display device 100 according to input user command S1111). Although transmitting the IR signal to the image source device 300 is typical based on the remote controller 400 operating at a second operation mode, the display device 100 may receive the IR signal through IR sniffing since the display device 100 may include an IR receiver.

The display device 100 may then generate a control signal including a control command corresponding to the remote controller IR signal (S1012). The display device 100 may transmit the generated control signal to the image processing device 200 (S1113). Based on the image source device not being concealed at this time, the display device may transmit the control command to the image source device 300 through the image processing device 200 and the image source device 300 may perform the twice repeated user command. Accordingly, to prevent such adverse effect, the control signals generated by the display device (S1112) may transmit a control command to the display device 100 indicating that an image source device dedicated IR signal has been received. That is, the image processing device 200 may be prevented from sending control commands such as channel up or volume down to the image source device 300.

Further, based on identifying state change of the display device corresponding to the control signal, whether the image source device 300 directly received the remote controller IR signal may be identified. Since the image source device 300 may not receive the remote controller IR signal based on the image processing device 200 and the image source device 300 being concealed, there would be no state change of the display device. Accordingly, after identifying that there is no state change of the display device 100, the remote controller 400 may generate a signal for changing to a first operation mode transmitting the BT signal by the remote controller 400 (S1115).

The image processing device 200 may transmit the change signal to the display device 100 (S1016), and the display device 100 may transmit the change signal to the remote controller 400 (S1117). Accordingly, the operation mode of the remote controller 400 may be changed to a first operation mode transmitting the BT signal based on the control command included in the received change signal (S1118).

Based on the remote controller 400 transmitting the BT signal to the display device 100 (S1119), the control command corresponding to the remote controller BT signal via the display device 100 and the image processing device 200 may then be transmitted to the image source device 300.

Accordingly, in FIGS. 10 and 11, the user may be able to control the image source device 300 without separate setting even if the position of the image processing device 200 or the image source device 300 is changed and user convenience may be improved.

The various embodiments described above may be implemented in a recordable medium which is readable by computer or a device similar to computer using software, hardware, or the combination of software and hardware. In some cases, the embodiments described herein may be implemented by the processor itself. According to a software implementation, embodiments such as the procedures and functions described herein may be implemented with separate software modules. Each of the above-described software modules may perform one or more of the functions and operations described herein.

Meanwhile, the computer instructions for performing the processing operations according to the various embodiments described above may be stored in a non-transitory computer-readable medium. The computer instructions stored in this non-transitory computer-readable medium may cause specific devices to perform the processing operations according to the above-described various embodiments when executed by the processor of the specific device.

The non-transitory computer readable medium refers to a medium that stores data semi-permanently rather than storing data for a very short time, such as a register, a cache, a memory or etc., and is readable by a device. Specific examples of the non-transitory computer readable medium may include, for example, a compact disc (CD), a digital versatile disc (DVD), a hard disc, a Blu-ray disc, a universal serial bus (USB), a memory card, a read only memory (ROM), and the like.

The description above illustrates and describes exemplary embodiments of the disclosure and are not to be construed as limiting the disclosure. It will be understood by those of ordinary skill in the art that various changes in form and details may be made therein without departing from the spirit and scope of the disclosure, and the various changes in form and details are not to be understood as individual from the technical idea or scope of the disclosure.

What is claimed is:

1. A display system, comprising:
a display device configured to transmit a first control signal for controlling an external image source device in response to a signal received from a remote controller operating in a first operation mode using a first communication; and
an image processing device configured to process an image received from the external image source device and transmit the processed image to the display device, and transmit the first control signal received from the display device to the image source device,
wherein the image processing device is configured to identify a state change of the display device corresponding to the first control signal, and transmit a signal for changing an operation mode of the remote controller to the display device based on the state change not being identified,
wherein the display device is configured to, based on the signal for changing the operation mode of the remote controller being received, transmit the received signal to the remote controller, and
wherein the remote controller is configured to:
receive the signal for changing the operation mode of the remote controller from the display device,
change the first operation mode to a second operation mode using a second communication, and
transmit a second control signal for controlling the external image source device to the external image source device.

2. The display system of claim 1, wherein the operation mode of the remote controller comprises the first operation mode transmitting a Bluetooth (BT) signal and the second operation mode transmitting an infrared (IR) signal,
wherein the first control signal is a control signal corresponding to a BT signal received by display device from the remote controller operating in the first operation mode, and
wherein the image processing device is configured to, based on a state change of the display device corresponding to the first control signal not being identified, transmit a signal for changing the remote controller to the second operation mode to the display device.

3. The display system of claim 1, wherein the first control signal transmitted from the image processing device to the external image source device is an IR signal.

4. The display system of claim 2, wherein the image processing device is configured to, based on the remote controller operating in the second operation mode and a state change of the display device corresponding to the first control signal not being identified, provide a user interface (UI) for guiding to change a position of at least one of the external image source device or the image processing device.

5. The display system of claim 1, wherein the image processing device is configured to store control code set information of the external image source device and transmit the first control signal corresponding to the signal received from the remote controller to the external image source device based on the stored information.

6. The display system of claim 1, wherein the image processing device is configured to identify a state change of the display device based on at least any one of a channel information region of an image output to the display device, a broadcast company logo region, a mute state generated based on changing a channel, or a volume control region.

7. An image processing device for processing an image received from an external image source device and transmitting the processed image to a display device, the image processing device comprising:
a communicator; and
a processor configured to receive a first control signal for controlling the external image source device from the display device, and controlling the communicator to transmit the received first control signal to the external image source device,
wherein the processor is configured to:
identify a state change of the display device corresponding to the first control signal, and
transmit a signal for changing an operation mode of a remote controller to the display device based on the state change not being identified,
wherein the signal is a signal for changing a first operation mode of the remote controller using a first communication to a second operation mode of the remote controller using a second communication and for transmitting a second control signal for controlling the external image source device from the remote controller to the external image source device.

8. The image processing device of claim 7, wherein the operation mode of the remote controller comprises the first operation mode transmitting a Bluetooth (BT) signal and the second operation mode transmitting an infrared (IR) signal,
wherein the first control signal is a control signal corresponding to a BT signal received by the display device from the remote controller operating in the first operation mode, and
wherein the processor is configured to, based on a state change of the display device transmission not being identified in response to the first control signal, transmit a signal for changing the remote controller to the second operation mode to the display device.

9. The image processing device of claim 8, wherein the first control signal transmitted to the external image source device through the communicator is an IR signal.

10. The image processing device of claim 8, wherein the processor is configured to, based on a state change of the display device not being identified, provide a UI for guiding to change a position of at least one of the image source device or the image processing device.

11. The image processing device of claim 8, further comprising a storage for storing a-control code set information of the external image source device,
wherein the processor is configured to control the communicator to transmit the first control signal corresponding to the signal received from the remote controller to the external image source device based on the stored information.

12. The image processing device of claim 7, wherein the processor is configured to identify a state change of the display device based on at least any one of a channel information region of an image output to the display device, a broadcast company logo region, a mute state generated based on changing a channel, or a volume control region.

13. A control method of an image processing device for processing an image received from an external image source device and transmitting the processed image to a display device, the method comprising:
- receiving, from the display device, a first control signal for controlling the external image source device;
- processing, by the image processing device, an image received from the external image source device, transmitting the processed image to the display device, and transmitting the first control signal received from the display device to the external image source device;
- identifying, by the image processing device, a state change of the display device corresponding to the first control signal;
- transmitting, by the image processing device, a signal for changing an operation mode of the remote controller to the display device based on the state change not being identified,
- wherein the remote controller receives the signal for changing the operation mode of the remote controller from the display device, changes the first operation mode to a second operation mode using a second communication, and transmits a second control signal for controlling the external image source device to the external image source device.

* * * * *